United States Patent
Den Hartog

(10) Patent No.: US 9,432,413 B2
(45) Date of Patent: Aug. 30, 2016

(54) USER EQUIPMENT AND METHOD FOR EXECUTING A SERVICE

(75) Inventor: Jos Den Hartog, Capelle a/d Ijssel (NL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 538 days.

(21) Appl. No.: 13/520,909

(22) PCT Filed: Jan. 14, 2010

(86) PCT No.: PCT/EP2010/050421
§ 371 (c)(1),
(2), (4) Date: Aug. 8, 2012

(87) PCT Pub. No.: WO2011/085816
PCT Pub. Date: Jul. 21, 2011

(65) Prior Publication Data
US 2013/0039361 A1    Feb. 14, 2013

(51) Int. Cl.
*H04L 12/66*    (2006.01)
*H04L 29/06*    (2006.01)

(52) U.S. Cl.
CPC ....... *H04L 65/1063* (2013.01); *H04L 65/1006* (2013.01)

(58) Field of Classification Search
CPC .............. H04W 4/00; H04W 28/0289; H04L 65/1063; H04L 65/1006
See application file for complete search history.

(56) References Cited

U.S. PATENT DOCUMENTS

| | | | |
|---|---|---|---|
| 7,948,921 B1 * | 5/2011 | Hughes et al. | 370/255 |
| 2001/0036176 A1 * | 11/2001 | Girard | 370/352 |
| 2004/0240450 A1 * | 12/2004 | Turcanu et al. | 370/395.2 |
| 2008/0039091 A1 * | 2/2008 | Eguchi et al. | 455/436 |
| 2008/0310397 A1 * | 12/2008 | Hu et al. | 370/352 |
| 2009/0003325 A1 * | 1/2009 | Lee et al. | 370/353 |
| 2009/0068996 A1 | 3/2009 | Bakker et al. | |
| 2009/0216906 A1 * | 8/2009 | Weniger et al. | 709/246 |
| 2009/0258634 A1 * | 10/2009 | Amine | H04L 29/1216 455/413 |
| 2010/0220667 A1 * | 9/2010 | Noldus et al. | 370/329 |
| 2010/0255819 A1 | 10/2010 | Robles et al. | |
| 2011/0131414 A1 * | 6/2011 | Cheng et al. | 713/170 |

FOREIGN PATENT DOCUMENTS

WO    2009083618 A2    7/2009

* cited by examiner

*Primary Examiner* — Asad Nawaz
*Assistant Examiner* — Jason Harley
(74) *Attorney, Agent, or Firm* — Coats & Bennett, PLLC

(57) ABSTRACT

User equipment and method for executing an application, which uses application data, and which is executed in an Application Server in a VoIP based telecommunications network. The method comprises providing a user equipment including a database having the data stored therein, wherein the user equipment further includes an Application Server. The method further comprises invoking the SIP-AS included in the user equipment by a network node of the telecommunications network, providing, within the user equipment, the data to the Application Server included in the user equipment, executing the application, using the data, by the Application Server included in the user equipment, and communicating a result of executing the application from the Application Server included in the user equipment to the network.

12 Claims, 5 Drawing Sheets

USER EQUIPMENT AND METHOD FOR EXECUTING A SERVICE

TECHNICAL FIELD

The invention relates to user equipment for use in a Voice over Internet Protocol (VoIP) based telecommunications network and a method for executing a service on an Application Server (AS) making use of an IP based communications protocol by using such user equipment. The method also relates to a network node for deploying an IP application in such user equipment. More in general, the invention relates to executing a service in a Voice over Internet Protocol (VoIP) telecommunications network, such as an Internet Protocol multimedia Subsystem (IMS) network.

BACKGROUND

In present Voice over Internet Protocol (VoIP) networks such as the Internet Protocol Multimedia Subsystem (IMS) telecommunications networks commonly the function of User Agent (UA), sometimes also referred to as client, is deployed in a user equipment such as a Personal Computer (PC) or mobile telephone. In an IMS network the functions of Proxy Call Session Control Function (P-CSCF), Interrogating Call Session Control Function (I-CSCF) and Serving Call Session Control Function (S-CSCF) are commonly deployed in network nodes, inside a secure environment, herein also referred to as "intranet", of the IMS-provider. Hence, network nodes inside the "intranet" of the IMS-provider are supposed to work inside a secure environment.

The function of Application Server (AS), e.g. Session Initiation Protocol Application Server (SIP-AS), is commonly deployed in network nodes, inside the secure environment of the IMS-provider. It is noted that the SIP-AS can belong to a 3rd party, i.e. the Internet Protocol Multimedia Service Control (ISC) interface (between an S-CSSF and the SIP-AS) may be an external interface. The use of such external interface requires agreements between the IMS-provider and the 3rd party.

SUMMARY

In Voice over Internet Protocol (VoIP) networks such as an Internet Multimedia Subsystem (IMS) telecommunications network, Internet Protocol (IP) based services (also termed applications herein) can be executed in a Internet Protocol (IP) based Application Server (AS), making use of an IP based communications protocol, such as a Session Initiation Protocol Application Server (SIP-AS). When a service is executed in a SIP-AS, the operator of the SIP-AS, e.g. the IMS-provider or the $3^{rd}$ party controlling and managing the application logic in the SIP-AS, has complete visibility of application data that is used for an IMS-subscriber that is using the service.

Even if the IMS-subscriber manages the application data himself, the fact that the application data is used in a SIP-AS, which is comprised by or connected to the IMS-network, exposes the data to the operator.

Even if the IMS-subscriber would trust the operator, there is no guarantee that his application data is not exposed. It is possible that the operator exposes the application data anyway, e.g. by error or by accident.

If an IMS-subscriber does not want to expose application data to the operator (and/or other parties), there is at present no way to have IMS-services executed that are implemented in a SIP-AS.

Therefore, an object of the invention is to provide a means or method to have an IP-service, implemented in an IP based Application Server (IP-AS), executed wherein at least some application data is not exposed to the IP-AS operator. More in general an object of the invention is to improve data security in an IP-service in a VoIP network.

Thereto, according to the invention is provided a user equipment for use in a VoIP based telecommunications network, the user equipment comprising a database storing application data, and an IP-AS using the IP based communications protocol for executing an application. The user equipment may further comprise a data transfer unit arranged for transferring application data from the database to the IP-AS, wherein the application data remains within the user equipment. The user equipment may further have associated therewith a User Agent (UA) arranged for using an IP based communications protocol. The user equipment may further comprise a first communications unit arranged for communication between the UA and the telecommunications network. The user equipment may further comprise a second communications unit arranged for communication between the IP-AS and the telecommunications network.

Such user equipment may be used according to the following method for executing an application, which uses application data, and which IP based application is executed in the IP-AS in a VoIP based telecommunications network. The method comprising the following steps:

providing the user equipment associated with a subscriber, the user equipment including the database having the application data stored therein, wherein the user equipment further includes the IP-AS, performing communication between a UA associated with the subscriber and the telecommunications network, e.g. initiating a SIP transaction, invoking the IP-AS included in the user equipment by a network node, such as a Serving Call Session Control Function (S-CSCF) entity of the telecommunications network, e.g. in response to the network receiving a message from the UA, e.g. in response to receiving a SIP Invite request message, providing, within the user equipment, the application data to the IP-AS included in the user equipment, executing the application, using the application data, by the IP-AS included in the user equipment, and communicating a result of executing the application from the IP-AS included in the user equipment to the network. It will be appreciated that after logging in, the UA is associated with the subscriber.

This provides the advantage that the application data remains within the confines of the user equipment while being used by the IP-AS. Hence, it may be achieved that the operator of the IP-AS is unable to view the application data.

It will be appreciated that the User Agent may be included within the user equipment. It is also possible that the User Agent is included in a further user equipment. In the latter case the user equipment may for instance be designed as a modem i.a. including the IP-AS and the further user equipment may be a personal computer (PC) including the user agent. It will be appreciated that the first communications unit included in the modem may handle communication between the user agent in the PC and the network.

Optionally, the second communications unit is arranged for providing secure communication with the network, e.g. via a secure tunnel. Thus, operator of the IP-AS is able to communicate with the user equipment based IP-AS in a secure manner, allowing the operator to handle the user equipment based IP-AS in a similar manner as a network based IP-AS.

Optionally, the second communications unit is arranged for receiving from a network node an application and for deploying that application in the IP-AS. Hence, the operator of the user equipment based IP-AS may deploy an application in the user equipment based IP-AS.

Optionally, the user equipment comprises a data management unit arranged for managing the application data included in the database, e.g. via a user interface of the user equipment. Hence, the user may manage the application data himself.

Optionally, the user equipment comprises an access control unit arranged for determining which portion of the application data included in the database may be accessed by the user equipment based IP-AS. Thus e.g. the user may set which application data may be used by an application. It is possible that multiple applications reside in the user equipment based IP-AS. It is possible that the user sets different application data as available to different applications.

Preferably, the user equipment based IP-AS resides in an operator space of the user equipment, wherein the user equipment is arranged such that the user cannot alter software components contained in the operator space. Hence, the operator of the IP-AS can trust the IP-AS. Optionally, the IP-AS is arranged to be able to be trusted by the user too. It is for instance possible that a source code of the application deployed in the user equipment based IP-AS is available for inspection by the user.

Preferably, the database resides in a user space of the user equipment, wherein the user equipment is arranged such that application data included in the user space cannot be viewed by a network node. Hence, the user can trust the secrecy and/or privacy of the application data. Optionally software running in the user space may be able to be trusted by the operator of the IP-AS, e.g. by being available for inspection by the operator.

Optionally, the user equipment is arranged for use in a SIP based telecommunications network. Then, the user agent is a Session Initiation Protocol User Agent (SIP-UA). The IP-AS may then be a Session Initiation Protocol Application Server (SIP-AS) for executing a SIP application.

Optionally, the user equipment is arranged for use in an IMS telecommunications network.

The invention also relates to a network node for use in a IP-based telecommunications network, arranged for deploying an application in a user equipment according to the invention. More in particular, the invention also relates to a network node for use in a SIP-based telecommunications network, arranged for deploying an SIP application in a user equipment according to the invention.

BRIEF DESCRIPTION OF THE DRAWINGS

The invention will now be further elucidated by means of non-limiting examples referring to the drawing, in which.

DETAILED DESCRIPTION

Figure 1:
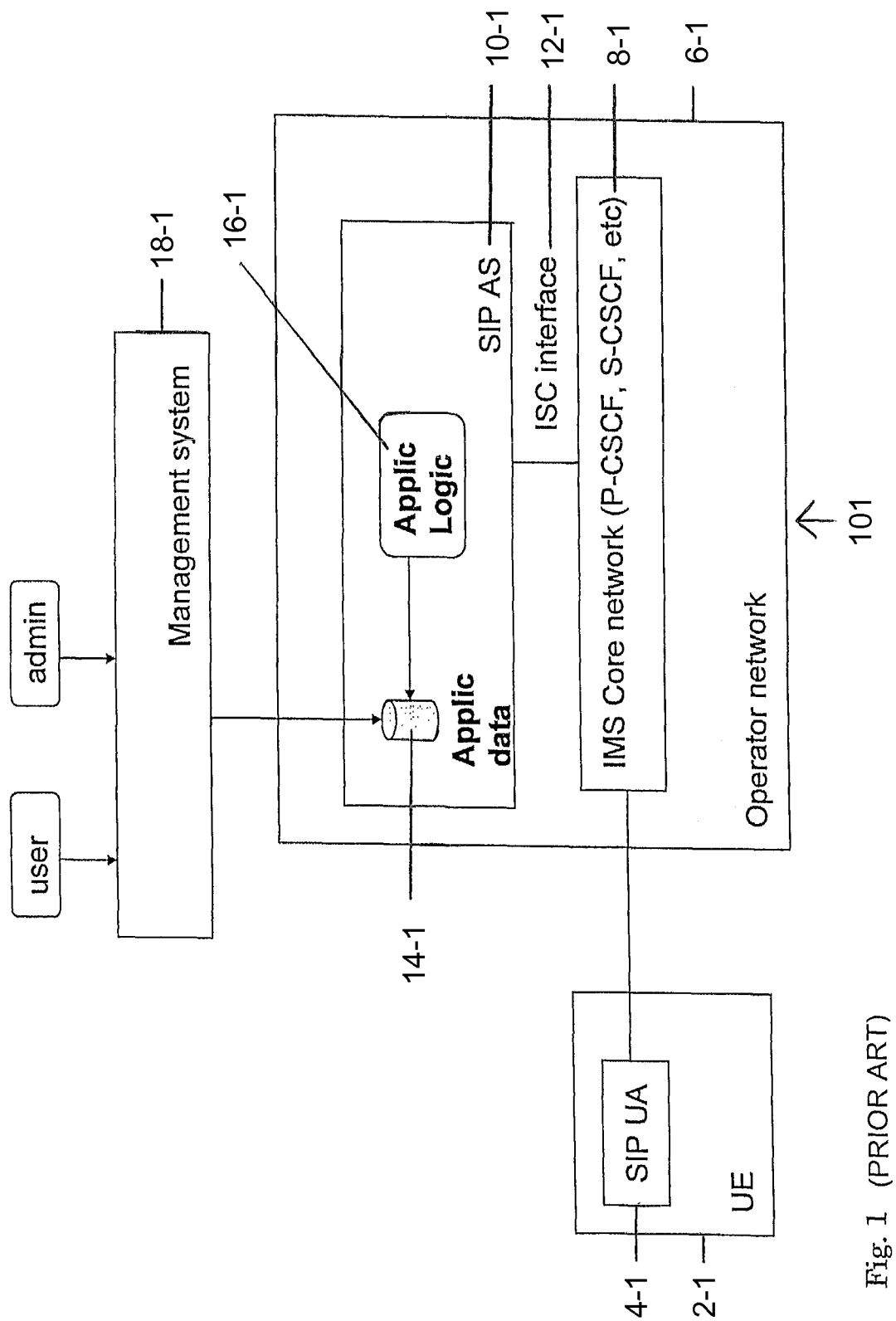
FIG. 1 shows an example of a prior art Session Initiation Protocol Application Server with network-based database.

FIG. 1 shows an example of a prior art system 101. In this example, a user equipment, UE, 2-1 is associated with a subscriber (not shown). The Session Initiation Protocol User Agent, SIP UA, 4-1 resides in the user equipment, UE. The SIP UA 4-1 allows for communication with the Operator network 6-1. The operator network comprises the Internet Protocol Multimedia Subsystem, IMS, core network 8-1. The IMS core network comprises network nodes performing the functions of Proxy Call Session Control function, P CSCF, Serving Call Session Control Function, S CSCF, Interrogating Call Session Control Function, I CSCF, etc. as is known in the art.

In the example of FIG. 1 the operator network 6-1 further comprises a Session Initiation Protocol Application Server, SIP AS 10-1, which is in communication with the IMS core network 6-1 via an Internet Protocol Multimedia Service Control (ISC) interface 12-1. In this example, the SIP AS 10-1 is deployed in a network node inside the secure environment of the IMS-provider. Thus, in this example the IMS core network operator is also the SIP AS operator. It will be appreciated that it is also possible that the SIP-AS 10-1 belongs to a 3rd party, i.e. another operator than the IMS core network operator.

Further, FIG. 1 shows that the SIP AS 10-1 comprises a repository 14-1 including a database including application data. Further, the SIP AS comprises an application logic unit 16-1 for executing the service using the application data. Herein the service is also referred to as application, such as SIP application.

The application data in the SIP AS repository 14-1 may be obtained from a management system 18-1. In this example, the subscriber may manage, e.g. add, delete or modify, the application data contained within the management system. In this example also an administrative body of the management system operator may manage the application data. The prior art system 101 described may for example, execute the following service:
- the application data includes location data representative of a location of the user equipment 2-1;
- the location data is submitted to a network based SIP AS 10-1;
- the service executed by the SIP AS 10-1 uses rules to determine which party is allowed to obtain the location data;
- the service uses rules to determine what information (e.g. an accuracy of the presented location data can be different for different parties) a party is allowed to obtain; and
- the allowed location data is provided to the allowed third party, possibly encoded.

To execute such a service, the service (1) must obtain the location data of the subscriber, e.g. with the best possible accuracy and (2) must know the rules on what information (e.g. location and/or accuracy) to present to whom.

When this service is executed as network-based SIP-AS 10-1 with a network-based database 14-1, the operator of the SIP AS must have access to the above application data to be able to execute the service.

Even if the subscriber would trust the operator of the SIP AS 10-1, there is no guarantee that his application data is not exposed.

Figure 2:
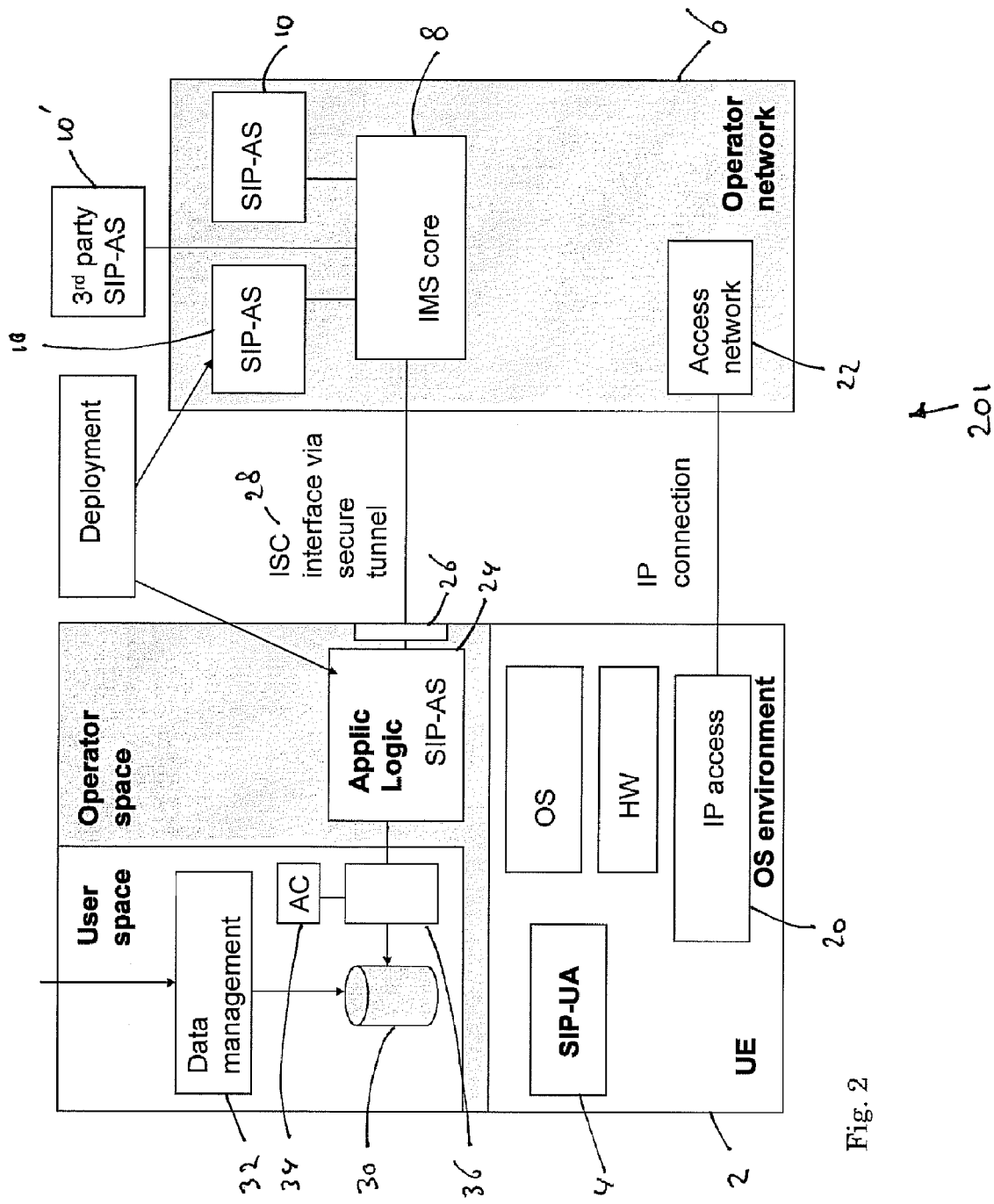
FIG. 2 shows a first example of a system according to the invention.

FIG. 2 shows an example of a system 201 according to the invention. In this example, a user equipment, UE, 2 is associated with a subscriber (not shown). The user equipment includes a first communications unit 20 for communicating with a Voice over Internet Protocol, VoIP, network, in this example an IMS network. The first communication unit 20 may be arranged to set up Internet Protocol, IP, access to an Access Network, AN, 22 of the operator network 6. A User agent, here a Session Initiation Protocol User Agent, SIP-UA 4, resides in the user equipment, e.g. in a SIP-UA unit.

In this example the operator network 6 comprises an IMS core network 8. The operator network 6 may further comprise one or more Application servers, such as SIP-AS's 10. The operator network may also be communicatively connected to a $3^{rd}$ party SIP-AS 10'.

In the example of FIG. 2, the hardware, HW, of the user equipment is trusted by the subscriber, for instance by means of being manufactured by a reputable manufacturer. Further, in this example, the middleware, or operating system, OS, of the user equipment is trusted by the subscriber, e.g. by means of being from a reputable manufacturer or verifiable nature. Also, the network operator similarly can trust the HW and OS of the user equipment. In this example the OS and the HW define an OS environment of the user equipment 4. The OS environment in this example is trusted by both the subscriber and the network operator. It will be appreciated that in this example the SIP-UA 4 resides in the OS environment.

In FIG. 2, the user equipment 2 contains an application server, here a SIP-AS 24, that is trusted both by operator and subscriber. The SIP-AS 24 is located in an operator space of the user equipment, which operator space is controlled by the operator. Optionally the operator space of the user equipment is closed for access by the subscriber. That is, the user equipment 2 may be arranged such that a subscriber cannot add, delete or modify any data and/or software included in the operator space. For instance, the user equipment 2 may be arranged such that a user interface of the user equipment does not provide access to the operator space. It will be appreciated that it may be possible that the user equipment 2 is arranged such that the subscriber can view software, such as the SIP-application, included in the operator space.

The user equipment 2 in FIG. 2 comprises a second communications unit 26 for communicating with the operator network 6. The user equipment based SIP-AS 24 is connected via this second communications unit 26 to the operator network, e.g. via an Internet Protocol Multimedia Service Control (ISC) interface 28. It will be appreciated that the operator may deploy software onto the SIP-AS 24, e.g. when the subscriber acquires a new service or the current service is updated. Preferably, the SIP-AS 24 is connected to the operator network 6 via a secure tunnel. When the operator has a secure tunnel to the operator space of the user equipment 2 and/or can deploy software on operator space of the user equipment, this part of the user equipment can be considered as part of the operator network. Thus, in this example, the connection between the user equipment based SIP-AS 24 and the operator network 6 is such that, as seen from the operator network, this SIP-AS 24 is part of his intranet.

It will be appreciated that the SIP-UA 4 may run in user space or in operator space.

The user equipment 2 contains a user equipment based repository 30 including a database. The database includes application data. The database is deployed in a user space of the user equipment, which user space is controlled by the subscriber. Optionally the user space of the user equipment is closed for access by the operator. That is, the user equipment 2 may be arranged such that an operator cannot add, delete or modify any data and/or software included in the operator space. Preferably, the user equipment is arranged such that the operator cannot view any data included in the operator space. It will be appreciated that it may be possible that the user equipment is arranged such that the operator can view software included in the user space.

The database is maintained and controlled by the subscriber. Thus, the subscriber has control over the application data. In this example, the subscriber can manage the data in the database via a data management unit 32. The data management unit can e.g. be operated by the subscriber via a user interface, such as a graphical user interface (GUI), of the user equipment. In this example, the subscriber can control access to the database via an Access Control (AC) unit 34. This AC unit 34 can determine which applications (both from operator space and from user space) can access the database. The AC unit 34 can also determine which data included in the database may be accessed by the user equipment based SIP-AS 24 and which data may not be accessed by the user equipment based SIP-AS. The AC unit 34 may control a data transfer unit 36 which is arranged for transferring application data from the database to the SIP-AS 24. It will be appreciated that it is not necessary that the data transfer unit 36 is controlled by the AC unit 34, since the application data transferred to the SIP-AS 24 does not leave the user equipment 2 if the application does not permit so.

Thus, a trusted SIP-application may be deployed that from the network (operator) point of view, the can be seen as a network-based application, because it is installed and/or maintained by the operator, and/or because it is running in a part of the user equipment 2 that acts as a network-node with respect to the network. To the subscriber using the user equipment, the user equipment based SIP-AS 24 provides the advantage that the SIP-application uses application data, while the application data remains within the confines of the user equipment.

One aspect of the invention relies on software, such as the OS of the user equipment, the SIP-AS 24, and/or the application, being trusted by both operator and subscriber. One possibility is that the source code of the SIP-application is be available and can be inspected by the subscriber or a third party which is trusted by the subscriber, e.g. an open-source community. Hence, the subscriber can be assured that the SIP-application only uses the application data from the user equipment based database for internal use within the confines of the user equipment, and does not expose the application data to any entity outside the user equipment. The deployed executable of the SIP-application can be related to the trusted, e.g. inspected, source code of the SIP-application, e.g. by check of a checksum of the executable as is known in the art, both by the subscriber and the operator.

Thus, the operator can trust that the SIP-AS 24 and the SIP application, which are part of his network, behave as agreed. The operator knows which logic is executed by the SIP-application, but has no access to the application data on which this logic is acting. Only the result of the execution, i.e. the answer from the SIP-AS 24 to the S-CSCF, is known to the operator.

Hence, the subscriber can have a networked-based SIP-application which uses user equipment based application data that is not exposed to the IMS-provider.

The system according to the invention may for example execute the following service:

the application data includes location data representative of a location of the user equipment;

the application data is transferred to the SIP-AS 24, but does not leave the user equipment;

the service executed by the SIP-AS 24 uses rules to determine which party is allowed to obtain the location data;

the service uses rules to determine what information (e.g. an accuracy of the presented location data can be different for different parties) a party is allowed to obtain; and the allowed location data is provided to the allowed third party, possibly encoded.

In this case, however, the location data remains within the user equipment when being evaluated by the service. Hence, the operator of the service has no access to the location data.

When executing a service provided by the user equipment based SIP-AS 24, the IMS core network 6, e.g. the S-CSCF, invokes the user equipment based SIP-AS 24. The S-CSCF may invoke the user equipment based SIP-AS 24 in response to receiving an SIP message, such as a SIP Invite request message. The Application Logic in the user equipment based SIP-AS 24 (trusted by both operator and subscriber) executes and reads (when needed) application data from the database. Herein the Access Control function may determine which application data may or may not be read by the user equipment based SIP-AS 24. Next, the result of the execution of the Application Logic is returned to the S-CSCF.

When using a network-based service in a VoIP based network, e.g. a SIP based telecommunications network, such as an IMS network, the operator of the service can combine that service with other network-based services into a package. The services may e.g. be executed by different SIP-AS's. The network, e.g. the S-CSCF in the IMS core network, may decide in which order to invoke the SIP-AS's associated with the services. Thereto, the S-CSCF may use Initial Filter Criteria (IFC). The package of services can have additional value compared to the separate services. For the S-CSCF, the user equipment based SIP-AS which e.g. is connected via a secure tunnel to the operator network, is equivalent to a SIP-AS that is part of the operator network. Hence, the S-CSCF is not obliged to first invoke the service provided by the user equipment based SIP-AS before invoking other services. The S-CSF may also first invoke a network based SIP-AS and then invoke the user equipment based SIP-AS. It will be appreciated that services that are based in the SIP-UA are to be executed prior to sending the SIP Invite request message to the network, i.e. prior to invoking services in network based SIP-AS's.

Figure 3:
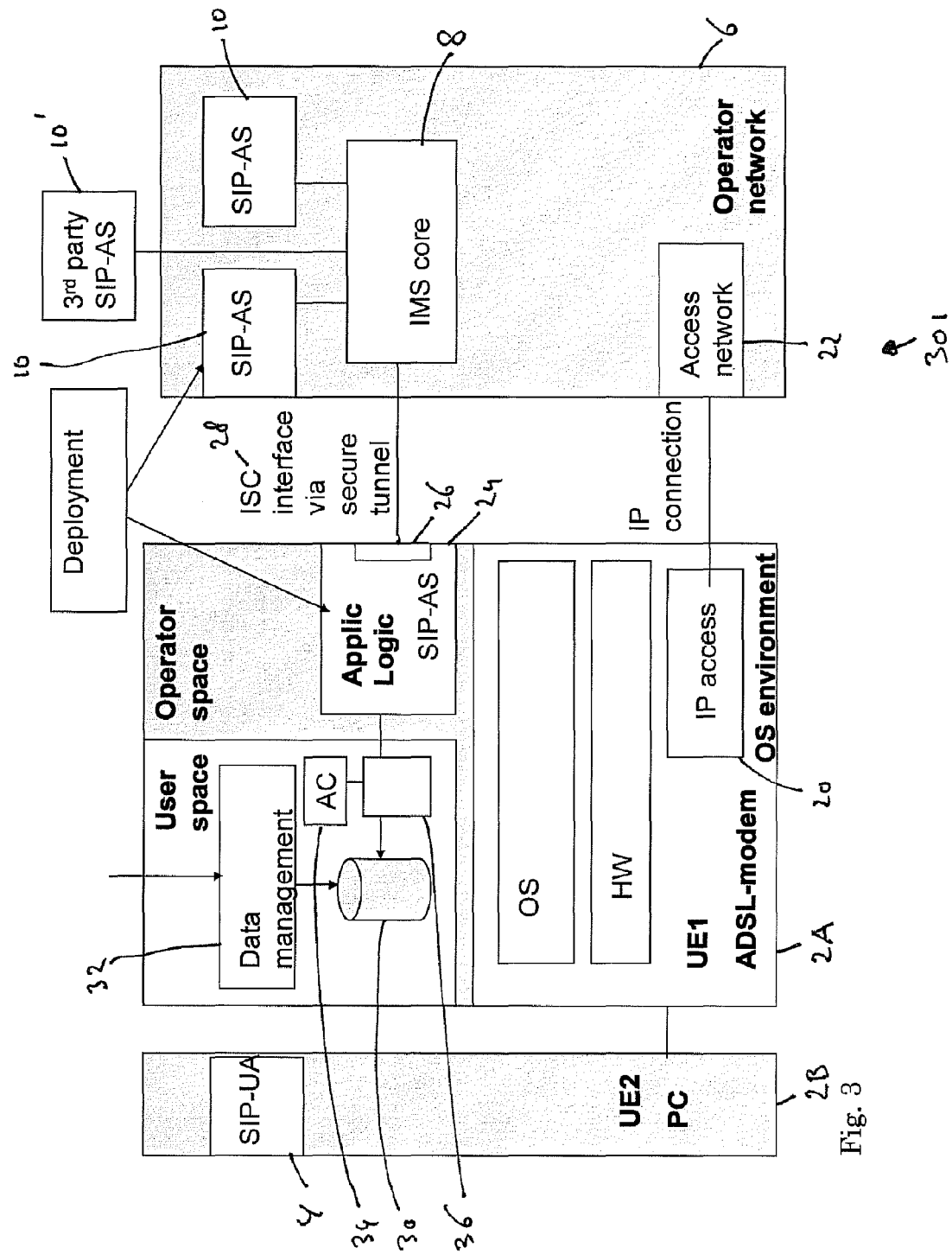
FIG. 3 shows a second example of a system according to the invention.

FIG. 3 shows a second example of a system 301 according to the invention. In this example, a first user equipment, UE1, 2A is associated with a subscriber (not shown) and a second user equipment, UE2, 2B is associated with the subscriber. In this example the first user equipment UE1 2A is designed as an Asymmetrical Digital Subscriber Line (ADSL) modem. In this example, the second user equipment UE2 2B is designed as a personal computer PC that is communicatively connected to the ADSL modem 2A.

In the example of FIG. 3, a SIP-UA 4 resides in the second user equipment UE2 2B. This SIP-UA 4 may e.g. be a SIP client. In the example of FIG. 3, the first user equipment UE1 2A includes a first communications unit 20 for communicating with the operator network 6. The first communication unit 20 may be arranged to set up IP access to an Access Network, AN, 22 of the operator network. Thus, the first communications unit 20 may provide a communications connection between the SIP-UA 4 and the operator network 6. It will be appreciated that after logging in the SIP-UA 4 is associated with the subscriber. In this example the operator network 6 comprises an IMS core network 8. The operator network 6 may further comprise one or more SIP-AS's 10. The operator network may also be communicatively connected to a 3rd party SIP-AS 10'.

In FIG. 3, the first user equipment UE1 2A contains a SIP-AS 24 that is trusted both by operator and subscriber. The SIP-AS 24 is located in an operator space of the user equipment 2A, which operator space is controlled by the operator. Optionally the operator space of the first user equipment 2A is closed for access by the subscriber.

The first user equipment 2A in FIG. 3 comprises a second communications unit 26 for communicating with the operator network 6. The first user equipment based SIP-AS 24 is connected via this second communications unit 26 to the operator network 6. It will be appreciated that the operator may deploy software onto the SIP-AS 24. Preferably, the SIP-AS 24 is connected to the operator network via a secure tunnel.

In the example of FIG. 3, the first user equipment 2A contains a user equipment based repository 30 including a database. The database includes application data. The database is deployed in a user space of the user equipment 2A, which user space is controlled by the subscriber. Optionally the user space of the user equipment 2A is closed for access by the operator. The database is maintained and controlled by the subscriber. In this example, the subscriber can manage the data in the database via a data management unit. The data management unit can e.g. be operated by the subscriber via a user interface, such as a graphical user interface (GUI), which in this example may be provided by the second user equipment 2B.

It will be appreciated that the system described with respect to FIG. 3 can be operated as explained with respect to FIG. 2, mutatis mutandis.

Figure 4:
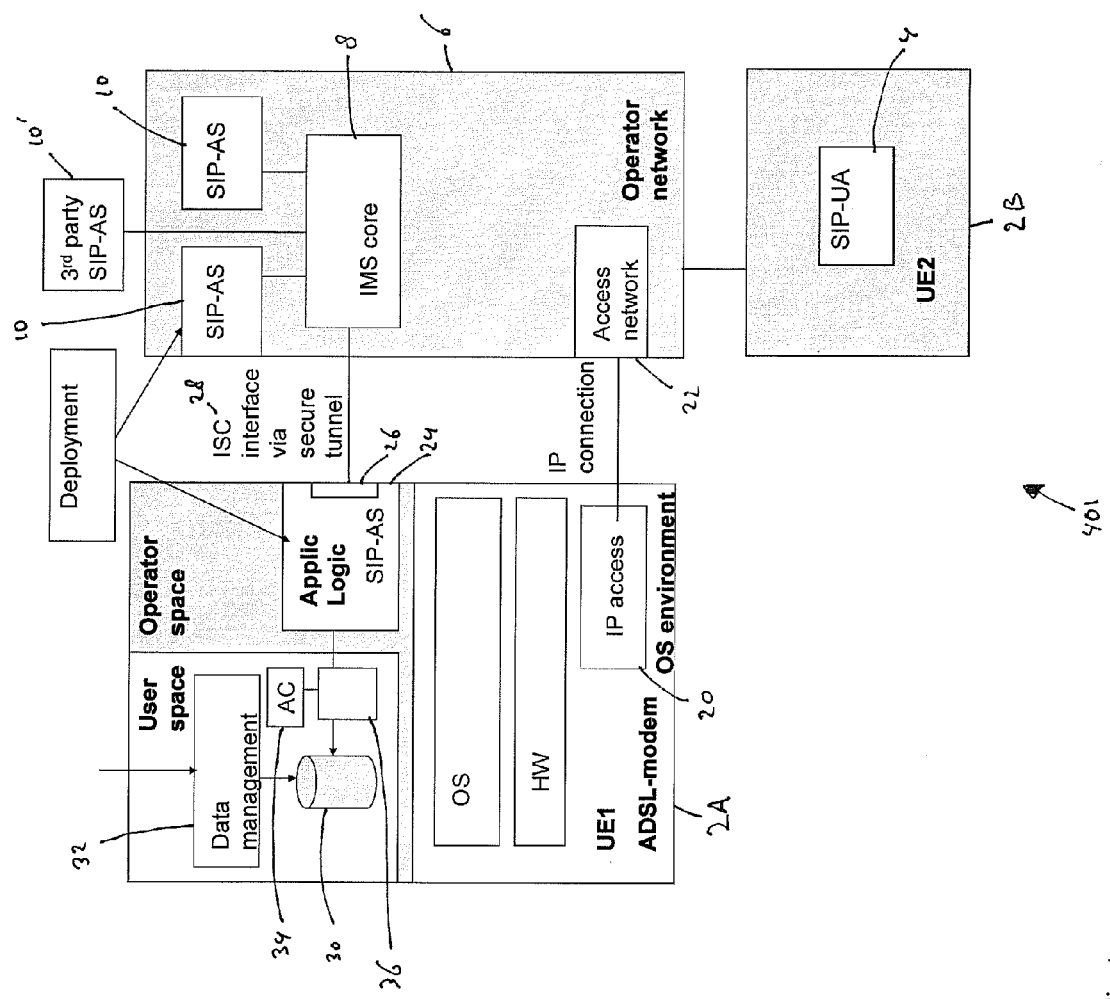
FIG. 4 shows a third example of a system according to the invention.

FIG. 4 shows a third example of a system 401 according to the invention. In this example, a first user equipment, UE1, 2A is associated with a subscriber (not shown) and a second user equipment, UE2, 2B is associated with the subscriber. In this example, the second user equipment UE2 2B is designed as a personal computer PC. In this example, the second user equipment may be stationed at a location remote from the first user equipment, although this is not necessary. In this example, the second user equipment UE2 2B may be a PC stationed in an internet café and the first user equipment UE1 2A may be an ADSL modem within the home of the subscriber. It will be appreciated that the first user equipment may also be other equipment, such as for instance a mobile communications device of the subscriber.

In FIG. 4, the first user equipment UE1 2A contains a SIP-AS 24 that is trusted both by operator and subscriber. The SIP-AS 24 is located in an operator space of the user equipment 2A, which operator space is controlled by the operator. Optionally the operator space of the first user equipment 2A is closed for access by the subscriber. In the example of FIG. 4, the first user equipment 2A contains a user equipment based repository 30 including a database. The database includes application data. The database is deployed in a user space of the user equipment 2A, which user space is controlled by the subscriber.

In the example of FIG. 4, a SIP-UA 4 resides in the second user equipment UE2 2B. This SIP-UA 4 may e.g. be a SIP client executed on the PC in the internet café. In the example of FIG. 4, the second user equipment UE2 2B may communicate with the operator network 6. If, during such communication the user equipment based SIP-AS 24 needs to be accessed by the network 6, the network 6 may access the SIP-AS 24 within the first user equipment UE1 2A.

It will be appreciated that the system described with respect to FIG. 4 can be operated as explained with respect to FIG. 2 and FIG. 3, mutatis mutandis.

In the foregoing specification, the invention has been described with reference to specific examples of embodiments of the invention. It will, however, be evident that various modifications and changes may be made therein without departing from the broader spirit and scope of the invention as set forth in the appended claims.

It will be appreciated that the user equipment may be e.g. an Asymmetric Digital Subscriber Line (ADSL) modem, mobile phone, computer based IMS-client, etc.

In the previous examples, the invention has been described with respect to a SIP-based network. It will be appreciated that the invention may also be practiced in other Voice over Internet Protocol (VoIP) based networks, using IP based communications protocols, e.g. using proprietary IP based protocols.

Figure 5:
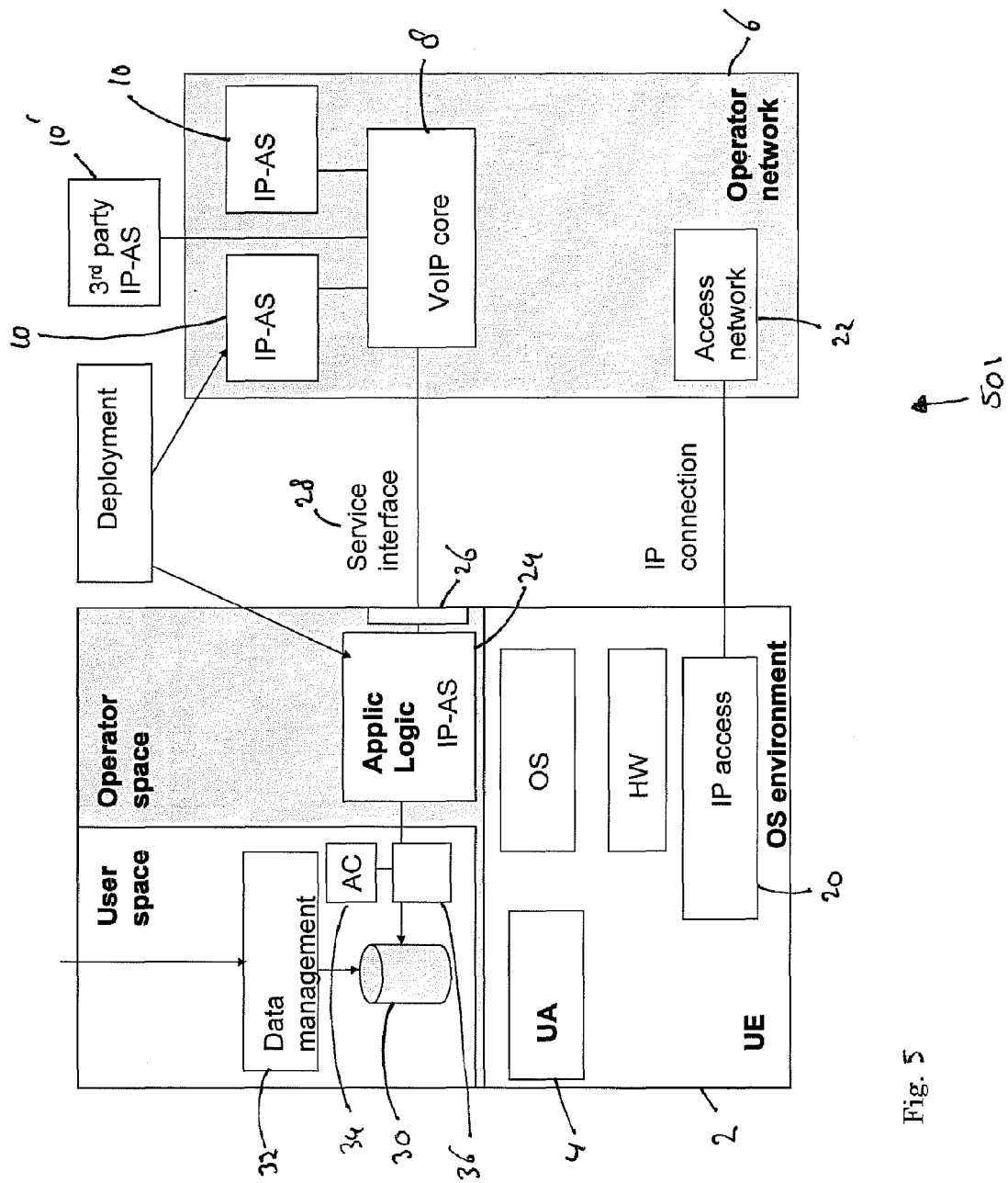
FIG. 5 shows a fourth example of a system according to the invention.

FIG. 5 shows an example of a system 501 according to the invention. In this example, a user equipment, UE, 2 is associated with a subscriber (not shown). The user equipment 2 includes a first communications unit 20 for communicating with the VoIP network 6. The first communication unit 20 may be arranged to set up IP access to an Access Network, AN, 22 of the operator network 6. A User Agent, UA, 4 arranged for using an IP based communications protocol resides in the user equipment 2, e.g. in a UA unit. It will be appreciated that the User Agent 4 may also reside in a further user equipment e.g. as demonstrated in FIG. 3 and FIG. 4.

In this example the operator network 6 comprises a VoIP core network 8. The operator network may further comprise one or more Internet Protocol based Application Servers (IP-AS's) 10. The operator network may also be communicatively connected to a $3^{rd}$ party IP-AS 10'.

In FIG. 5, the user equipment 2 contains an IP-AS 24, that is trusted both by operator and subscriber. The IP-AS 24 is located in an operator space of the user equipment, which operator space is controlled by the operator. Optionally the operator space of the user equipment 2 is closed for access by the subscriber. The user equipment 2 in FIG. 5 comprises a second communications unit 26 for communicating with the operator network 6. The user equipment based IP-AS 24 is connected via this second communications unit 26 to the operator network 6, e.g. via a service interface 28. It will be appreciated that the operator may deploy software onto the IP-AS 24.

The user equipment 2 contains a user equipment based repository 30 including a database. The database includes application data. The database is deployed in a user space of the user equipment, which user space is controlled by the subscriber. Optionally the user space of the user equipment is closed for access by the operator. The database is maintained and controlled by the subscriber. Thus, the subscriber has control over the application data.

Hence, according to the invention in general the user equipment for use in a Voice over Internet Protocol based telecommunications network comprises a database storing data, an Application Server using the Internet Protocol based communications protocol for executing an application, a data transfer unit arranged for transferring data from the database to the Application Server, wherein the data remains within the user equipment, and a communications unit arranged for communication between the Application Server and the telecommunications network. Optionally, such user equipment has associated therewith a User Agent arranged for using an Internet Protocol based communications protocol, and the user equipment may comprise a further communications unit arranged for communication between the User Agent and the telecommunications network.

It will be appreciated that the system described with respect to FIG. 5 may be operated in a manner similar to the system described with respect to FIG. 2, albeit in any VoIP network.

It will be appreciated that similarly the system as described with respect to FIG. 3 or FIG. 4 may also be used in any VoIP network, mutatis mutandis.

However, other modifications, variations, and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A user equipment for use in a Voice over Internet Protocol based telecommunications network, having associated therewith a User Agent arranged for using an Internet Protocol based communications protocol, the user equipment configured to:
    store data in a database;
    responsive to a subscriber acquiring a new service or updating a current service:
        receive an application from a network node in the telecommunications network;
        deploy the application in an Application Server that resides on the user equipment and uses the Internet Protocol based communications protocol;
    execute the application via the Application Server;
    transfer data from the database to the Application Server, wherein the data remains within the user equipment;
    communicate between the User Agent and the telecommunications network; and
    communicate between the Application Server and the telecommunications network;
    wherein at least one of:
        the Application Server resides in an operator space of the user equipment, such that the user cannot alter software components contained in the operator space; and
        the database resides in a user space of the user equipment, such that data included in the user space cannot be viewed by the network node.

2. The user equipment of claim 1, wherein the user equipment is configured to communicate between the Application Server and the telecommunications network securely via a secure tunnel.

3. The user equipment of claim 1, wherein the user equipment is further configured to manage the data included in the database via a user interface.

4. The user equipment of claim 1, wherein the user equipment is further configured to determine which portion of the data included in the database may be accessed by the Application Server.

5. The user equipment of claim 1, wherein the user equipment is further configured to include the User Agent.

6. The user equipment of claim 1:
wherein the user equipment is configured for use in a Session Initiation Protocol based telecommunications network, such as an Internet Protocol Multimedia Subsystem telecommunications network;
wherein the User Agent is a Session Initiation Protocol User Agent; and
wherein the Application Server is a Session Initiation Protocol Application Server for executing a Session Initiation Protocol application.

7. A method for executing an application, using data, executed in an Internet Protocol based Application Server in a Voice over Internet Protocol based telecommunications network, comprising:
communicating, by a User Agent, with the telecommunications network, wherein the User Agent is associated with a subscriber and resides on a user equipment also associated with the subscriber;
receiving, by an Internet Protocol based Application Server residing in an operator space of the user equipment, an invocation from a network node of the telecommunications network;
responsive to the subscriber acquiring a new service or updating a current service, receiving the application from the network node and deploying the application in the Internet Protocol based Application Server;
providing data, from a database residing in a user space of the user equipment, to the Application Server included in the operator space of the user equipment, wherein the data remains within the user equipment;
executing the application, using the data, by the Application Server residing in the operator space of the user equipment; and
communicating to the network, by the Application Server residing in the operator space of the user equipment, a result of executing the application;
wherein data in the user space cannot be viewed by the network node; and
wherein software components in the operator space cannot be altered by a user of the user equipment.

8. The method of claim 7, wherein communication between the Internet Protocol based Application Server included in the user equipment and the network is secure communication via a secure tunnel.

9. The method of claim 7, further including managing the data included in the database, via a user interface of the user equipment, by the user.

10. The method of claim 7, further including controlling, by the user, which portion of the data included in the database may be accessed by the user equipment based Internet Protocol based Application Server.

11. A system for use in a Voice over Internet Protocol based telecommunications network, such as a Session Initiation Protocol based telecommunications network, arranged for deploying an application, the system comprising:
a user equipment configured to:
store data in a database;
responsive to a subscriber acquiring a new service or updating a current service:
receive the application from a network node in the telecommunications network:
deploy the application in an Application Server that resides on the user equipment and uses an Internet Protocol based communications protocol;
execute the application via the Application Server;
transfer data from the database to the Application Server, wherein the data remains within the user equipment;
communicate between a User Agent and the telecommunications network; and
communicate between the Application Server and the telecommunications network;
wherein at least one of:
the Application Server resides in an operator space of the user equipment, such that the user cannot alter software components contained in the operator space; and
the database resides in a user space of the user equipment, such that data included in the user space cannot be viewed by the network node of the telecommunications network;
a deployment network node configured to deploy the application into the user equipment by sending the application to the Application Server for execution.

12. A method, implemented by network nodes in a Voice over Internet Protocol based telecommunications network, such as a Session Initiation Protocol based telecommunications network, the method comprising:
responsive to a subscriber acquiring a new service or updating a current service, deploying an application into a user equipment associated with the subscriber by sending, from a deployment network node, the application to an Internet Protocol based Application Server residing in an operator space of the user equipment, thereby enabling the application to be executed by the Application Server;
communicating, by a User Agent, with the telecommunications network, wherein the User Agent is associated with the subscriber and resides on the user equipment;
receiving, by the Internet Protocol based Application Server residing in the operator space of the user equipment, an invocation from a network node of the telecommunications network;
providing data, from a database residing in a user space of the user equipment, to the Application Server included in the operator space of the user equipment, wherein the data remains within the user equipment;
executing the application, using the data, by the Application Server residing in the operator space of the user equipment; and
communicating to the network, by the Application Server residing in the operator space of the user equipment, a result of executing the application;
wherein data in the user space cannot be viewed by the network node; and
wherein software components in the operator space cannot be altered by a user of the user equipment.

* * * * *